Dec. 9, 1947.  A. VANG  2,432,218
APPARATUS AND METHOD FOR GENERATING SOUND
Filed July 15, 1944  2 Sheets-Sheet 1

INVENTOR.
ALFRED VANG.
BY Peter M. Boesen
ATTORNEY.

Dec. 9, 1947.  A. VANG  2,432,218
APPARATUS AND METHOD FOR GENERATING SOUND
Filed July 15, 1944  2 Sheets-Sheet 2

INVENTOR.
ALFRED VANG.
BY Peter M. Boesen
ATTORNEY.

Patented Dec. 9, 1947

2,432,218

UNITED STATES PATENT OFFICE 2,432,218

APPARATUS AND METHOD FOR GENERATING SOUND

Alfred Vang, New York, N. Y.

Application July 15, 1944, Serial No. 545,154

6 Claims. (Cl. 177—386)

In the generation of high frequency sound the generators, such as the magnetostrictive or piezoelectric vibrators, air jet generators or high frequency loud speakers have been unsatisfactory.

A modification of the dynamic loud speaker employing a resonant free-free metallic bar set in longitudinal vibration by means of an alternating current "voice coil" has been tried hitherto as a generator with somewhat better results. However, the use of alternating current in the voice coil of such a vibrator results in poor mechanical efficiency. This mechanical inefficiency is due, in part, to mechanical hysteresis loss when the bar is subjected alternately to compression and tensile stresses external of the bar which also produce fatigue in the metal.

It is extremely difficult to provide an alternating current having a wave form which at some time in its period will produce forces that will not lead or lag the movements of the bar while it is vibrating at its natural fundamental frequency. In addition, vibrations at transient frequencies or harmonics will act against forces set up by an alternating current so as to dissipate a portion of the energy. Furthermore, alternating currents necessary for operating such a vibrator must be produced by expensive apparatus which also requires careful adjustment.

In order to prevent the vibrations of the bar from being opposed by magnetic forces in such a vibrator, I use a unidirectional pulsating or intermittent current for actuating the vibrating bar. In this manner, I apply external forces in only one direction against the bar, such as a compressive force to an end of the bar and allow the extension of the bar to follow only by its own resilience at resonant frequency. Of course, I may distend one end of the bar and allow it to retract by its own resilience. The pulsating current may be applied to a non-resonant vibrator, such as a cone speaker.

In the accompanying drawing showing, by way of example, three of many possible embodiments of the invention:

Figure 2 is a wiring diagram showing means for actuating the vibrator; while

Figure 1:
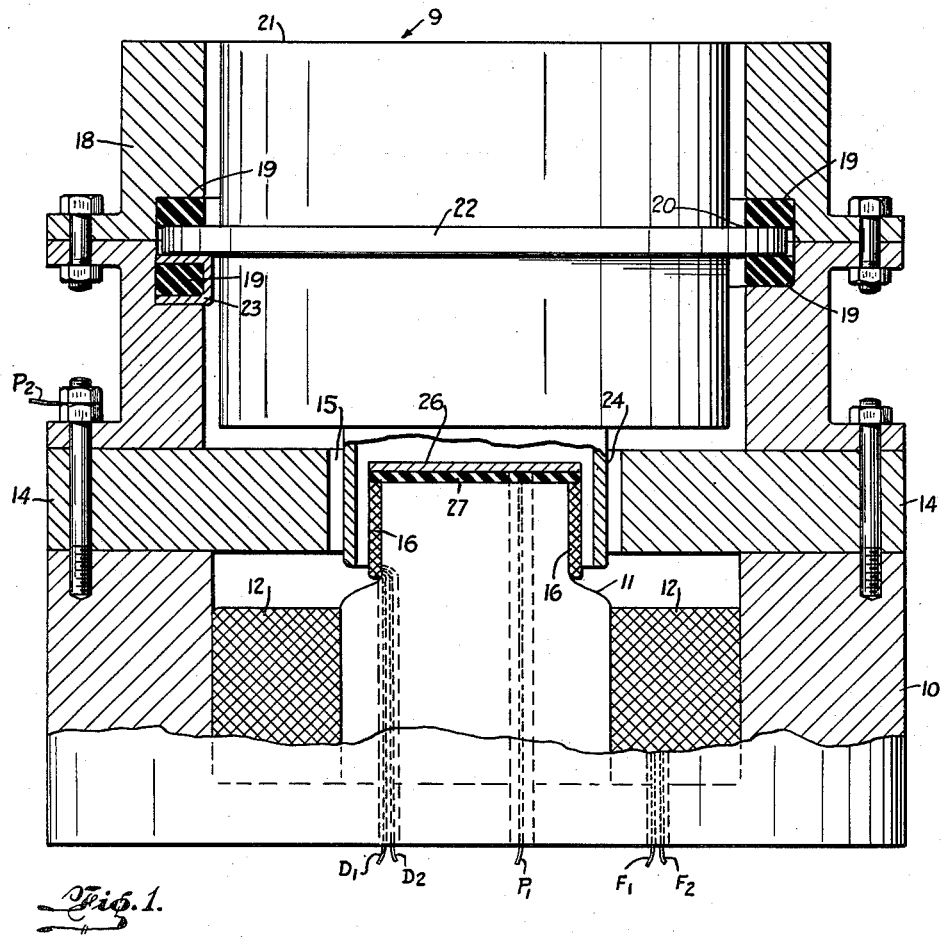
Figure 1 is a vertical cross sectional view of the resonant generator.
Figure 2:
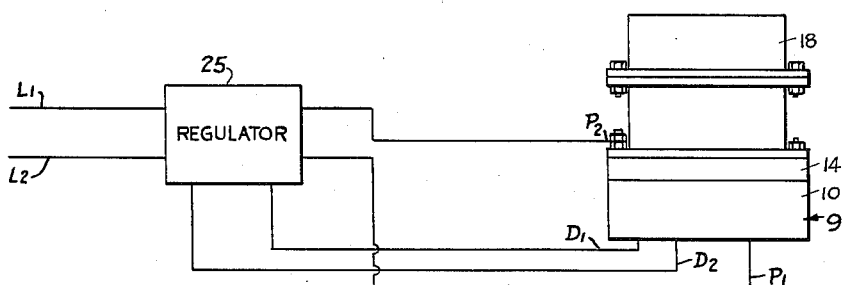

The generator 9 comprises a stationary pot magnet body 10 of magnetic material, having an axially central pole 11 and field coil 12 therearound; said coil being provided with external leads F1F2. An annular pole-piece 14 is mounted on the outer peripheral portions of the body and surrounds the outer end of said pole 11 spaced therefrom to form an annular air gap 15. The body and pole piece may, of course, be of alloy magnetic material to form a permanent magnet. A driving coil 16 having leads D1D2 is wound around on the outer end portion of the central pole 11.

A hollow cylindrical support 18 mounted on said pole-piece carries a pair of annular rubber shims 19 embedded in the support between which is formed an internally open circumferential groove 20. A vibrator 21 mounted on said support and having a natural high frequency resonance comprises a solid metallic cylinder of Duralumin or other suitable material having an annular web or flange 22 projecting radially from the mid portion or node of the cylinder and mounted in the groove between said shims 19, so that the cylinder is free to vibrate longitudinally as a free-free bar at its natural period.

The vibrator 21 is grounded to the support 18 and body 10 by means of a strip of metal foil 23 in contact with the flange 22. A metallic driving ring 24, preferably integral with the vibrator, projects from the inner face of the cylinder into said air gap 15 and adjacent the driving coil, so that the latter may induce currents into the ring 24. The vibrator may be non-resonant and be made of non-metallic material, such as the cone of a conventional loud speaker and operate at various current frequencies. A source of pulsating or intermittent unidirectional current is connected to the driving coil 16, as described later herein.

In operation, the field coil 12 is energized in the conventional manner by a steady direct current. A pulsating unidirectional current is applied to the driving coil 16 at a frequency equal to the natural frequency of the vibrator bar, so that at the first surge of current in the driving coil, a large current is induced in the driving ring 24, which acts as a single secondary turn of an induction coil or transformer. The induced current in the ring 24 then creates a magnetic field about said ring, which reacts with the field of the pot magnet, whereby the ring is either drawn into or forced from the air gap 15, depending upon the direction of the driving current or the polarity of the magnet.

Assuming that the ring tends to be expelled from the gap by each flow of current in the driving coil, the vibrator is, in effect, given a longitudinal blow for each surge of said current. As the current dies, no external strain is applied to the bar, so that it is perfectly free to complete a period of vibration merely as a result of its own resiliency. It will be realized that the frequency of the exciter current may be a lower harmonic of the natural resonance of the bar, so that one or more periods of vibration may occur before the bar is given another "blow."

Pulsating currents of various wave forms may be used, depending on the characteristics of the vibrator, such as half-wave rectified alternating current, full-wave rectified alternating sine-wave current, current from sweep circuits having low tripping voltage, making the charging portion of the wave substantially linear, or current from sweep circuits with the amplitude control advanced, resulting in a slight departure from linearity, or even where bias is applied to produce a very definite bend in the charging portion of the cycle. Current having reverse saw tooth wave forms may also be used, wherein the charging portion of the cycle is steep and the discharge is gradual. Square wave or substantially purely intermittent direct current, which suddenly rises to a value where it is maintained for a relatively longer period of time and then abruptly falls to zero, may also be used.

The cross-sectional area of the vibrator changes during vibration, so that even though the modulus of elasticity were constant, the restorative force over the entire cross-sectional area would not be proportional to the displacement of the vibrator. Neither are the elastic moduli of compression and tension equal. Hence, it may be said that in no case can the vibrator vibrate with simple harmonic motion or that its motion can be accurately projected on a circle. Therefore, the motion of the vibrator cannot be continually actuated by a sine-wave alternating current without a dissipation of energy.

On the other hand, by my use of pulsating unidirectional current I may reduce the period of applying external forces on the vibrator to a minimum, and in so doing I relieve the vibrator of excessive counter forces which have hitherto greatly shortened the life of the vibrator.

By altering the wave form of the current I may apply a sudden force of short duration to the vibrator as would be obtained when current having steep peaks, either close together or widely separated, or reverse saw tooth wave form is used, such as shown by H. W. St. Clair, Review of Scientific Instruments, vol. 12, May 1941, 250–256. The output of the St. Clair regulator may be rectified, and the rectified output used to ionize the tube 121 of Figure 4 herein. On the other hand, I may apply a force more gradually, as obtained with a current having a saw tooth wave form. In any event, the current falls approximately to or slightly below zero, but is substantially unidirectional.

The flow of current with respect to strength and/or frequency in the driving coil 16 may be controlled by means of a known regulator 25 responsive to a change in capacity of a condenser. The regulator is responsive to the position of the inner face of the vibrator, acting as a moving electrode with respect to a pick-up disk 26 as a stationary electrode mounted on the outer end of the pole 11, but insulated therefrom by means of a suitable insulator 27 such as that of St. Clair cited above. Leads P1P2 to the disk and body are operatively connected to the regulator 25, which is in turn connected to a source of unidirectional current L1L2.

Figure 3:
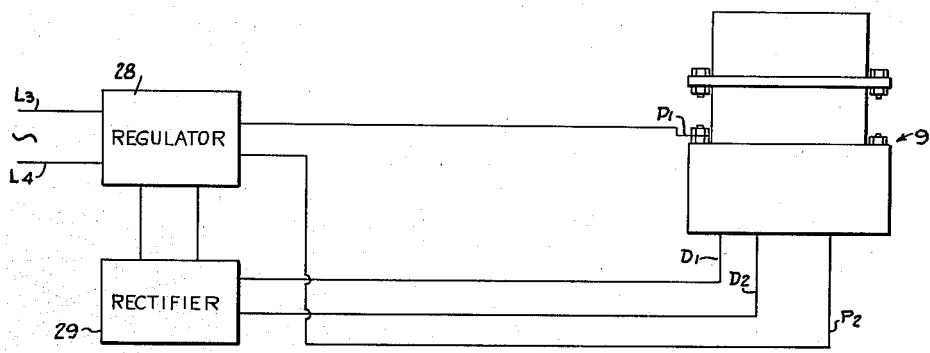
Figure 3 is a wiring diagram showing another means for actuating the vibrator.

In another form of the invention, as shown in Figure 3, the pick-up may be used to regulate an alternating current from a source L3L4 by means of a known regulator 28. The regulated current is subsequently rectified by means of a rectifier 29, to which are connected leads D1D2. Thus, in effect, current strength and/or frequency may be regulated when the current is in alternating form and the current applied to the vibrator in pulsating form.

Regulators 25 and 28 may, of course, be omitted if a pulsating current of suitable frequency and strength for actuating the vibrator can be obtained, and known means other than the pick-up 26 may be used with the regulators for maintaining maximum amplitude of vibration and resonance.

I have found that for a given generator of the dynamic type, the change from alternating to pulsating current of equal power input increases the generator output by approximately 300%.

Figure 4:
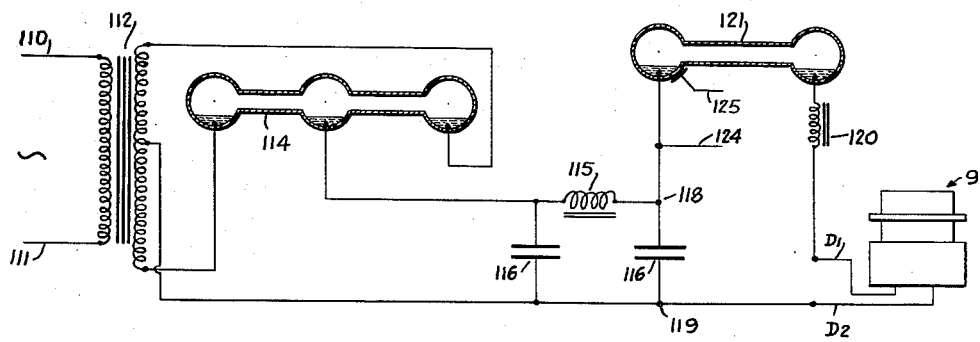
Figure 4 is a wiring diagram showing means for producing pulsating current.

Figure 4 shows a novel means for producing current for sound generator where pulsating currents up to the order of 10 amperes may be required. Hitherto, sound generators have been operated on high frequency current produced by thermionic valve oscillators. Such oscillators have proved unsatisfactory both because of their producing alternating current, inefficient for this purpose as shown above, and because of their high cost when large currents are required.

A commercial source of alternating current 110, 111 is connected to the primary of a transformer 112, having a center-tapped secondary. The current from the secondary is rectified by means of a double armed rectifier 114, as described in my copending application, Serial No. 536,341, filed May 19, 1944. The output from the rectifier is filtered by means of a choke coil 115 and condensers 116, thus providing a filtered direct current supply at the terminals 118, 119.

Connected in series with the direct current supply are leads D1, D2 to the driving coil 16 of the generator, a choke coil 120, and an externally ignited mercury arc tube 121 as described in my copending application mentioned above. The tube 121 is ignited at the desired frequency by an external source of current 124, 125 of the order of 0.01 milliamperes at about 5000 volts or sufficient potential to ignite the tube. Of course, the frequency and voltage of the discharge circuit must be low enough to allow the mercury of the arc tube to deionize, so that it be ignited or re-ignited at this desired frequency. In the event that the natural frequency of the bar is so high that its period is shorter than the time required for deionization of the mercury, the frequency of the current may be a lower harmonic of the natural resonance of the bar, so that one or more periods of vibration may occur before the bar is given another "blow" as stated above herein. The igniting current and voltage function more nearly as a series of controlled static charges which may be obtained in any known manner and their frequency may be directly governed by the movement of the vibrator, especially when the latter is to operate at its natural resonance. However, the frequency of the igniting current may be controlled by means non-responsive to the vibrator, such as by a conventional oscillator. The inductance, capacity, and resistance in the discharge circuit should be of such values that the circuit is substantially non-oscillatory.

While I have shown the driving coil of the generator connected directly into the discharge circuit, the primary of a transformer may be so connected instead, and the driving coil connected to the secondary in the usual manner.

It is obvious that slight changes may be made in the form, construction and arrangement of the several parts, as shown, within the scope of the appended claims, without departing from the spirit of my invention, and I do not, therefore, wish to limit myself to the exact construction and arrangement shown and described herein.

What I claim as my invention, and desire to secure by Letters Patent of the United States, is:

1. A sound generator comprising a massive body mounted to vibrate at its own resonance; an armature on one end of said body; means providing a substantially constant magnetic field in the vicinity of said armature; means providing about said armature a unidirectional intermittent magnetic field of duration not greater than half the period of the body and at a frequency equal to the resonant frequency of said body and reacting with said constant magnetic field.

2. A high frequency sound generator comprising in combination, a strong pot magnet having an axially central pole and peripheral portions spaced therefrom to leave a narrow annular air gap; a massive metallic cylinder provided with an annular ring projecting into said gap, the cylinder being mounted to vibrate as a free-free bar; a coil of wire wound upon the outer end portion of said pole and adjacent said ring and capable of inducing a current therein; a source of intermittent unidirectional current of duration not greater than half the period of the cylinder and resonant therewith and operatively connected to said coil for supplying current thereto; and means responsive to the amplitude of vibration of the cylinder for altering the strength of the current in the coil.

3. A method for the maintenance of vibration in a resonant body of the free-free bar type, said method comprising periodically applying a magnetic force to the body in only one direction and at a frequency resonant with the body, the duration of the application of said force being less than half the period of the body, so that portions of the body are displaced in only one direction by said force and are free to complete a cycle by only the resilience of the body.

4. A generator for sound comprising a massive metallic cylinder mounted to vibrate longitudinally as a free-free bar; an armature on one end of said cylinder; means providing a substantially constant stationary magnetic field adjacent said armature and perpendicular to the direction of the motion of the cylinder; and means providing about said armature a unidirectional intermittent magnetic field of duration not greater than half the period of the bar and at a frequency equal to resonant frequency of said vibrator and reacting with said constant magnetic field, the resultant force of the two fields being in said direction of motion so as to cause the vibrator to vibrate at resonant frequency.

5. A high frequency sound generator comprising in combination, a strong pot magnet having an axially central pole and peripheral portions spaced therefrom to leave a narrow annular air gap, a massive metallic body provided with an annular ring of conducting material projecting into said gap, the body being mounted to vibrate as a free-free bar, a coil of wire wound on the outer end portion of said pole and adjacent said ring and capable of inducing a current therein, a source of intermittent unidirectional current connected to said coil for supplying current thereto, the ratio of the natural frequency of the body to the frequency of the intermittent current being a whole number and the duration of current flow being not greater than half the period of the body.

6. A high frequency sound generator comprising a massive cylinder mounted at the longitudinal mid portions thereof and adapted to vibrate as a free-free bar, electro-magnetic means for actuating the cylinder, and a source of intermittent unidirectional current operatively connected to said means, the natural frequency of the cylinder to the frequency of current flow being in the ratio of a whole number, and the duration of current flow through the means being less than half the period of the cylinder, flow of current distorting the cylinder and absence of current permitting the cylinder to vibrate substantially by the elasticity thereof.

ALFRED VANG.

REFERENCES CITED

The following references are of record in the file of this patent:

UNITED STATES PATENTS

| Number | Name | Date |
| --- | --- | --- |
| 1,212,202 | Fessenden | Jan. 16, 1917 |
| 1,937,602 | Stewart | Dec. 5, 1933 |
| 1,842,770 | Thompson | Jan. 26, 1932 |
| 1,518,123 | Lawther | Dec. 2, 1924 |
| 1,923,959 | Williams | Aug. 22, 1933 |
| 2,017,695 | Hahnemann | Oct. 15, 1935 |
| 1,152,697 | Bodde | Sept. 7, 1915 |
| 2,364,679 | Williams | Dec. 12, 1944 |
| 2,349,656 | Gulliksen | May 23, 1944 |
| 2,338,640 | Hellier | Jan. 4, 1944 |

FOREIGN PATENTS

| Number | Country | Date |
| --- | --- | --- |
| 544,791 | Germany | Feb. 22, 1932 |

OTHER REFERENCES

"An Electromagnetic Sound Generator For Producing Intense High Frequency Sound" by H. W. St. Clair, Review of Scientific Instruments, vol. 12, May 1941, pp. 250–256.